United States Patent [19]

Murabayashi et al.

[11] Patent Number: 5,280,394
[45] Date of Patent: Jan. 18, 1994

[54] RECORDING/REPRODUCING APPARATUS FOR DETERMINING THE MODE OF A RECORDED DIGITAL AUDIO SIGNAL BY DETECTING DIFFERENT CLOCK FREQUENCIES AT SELECTED TIMES

[75] Inventors: Noboru Murabayashi, Tokyo; Teruhiko Kori, Kanagawa, both of Japan

[73] Assignee: Sony Corporation, Tokyo, Japan

[21] Appl. No.: 718,980

[22] Filed: Jun. 21, 1991

[30] Foreign Application Priority Data

Jun. 27, 1990 [JP] Japan .................. 2-169075

[51] Int. Cl.⁵ .................. G11B 5/02; H04N 5/782
[52] U.S. Cl. .................. 360/27; 360/19.1; 360/8
[58] Field of Search .................. 360/8, 18, 19.1, 25, 360/27, 33.1

[56] References Cited

U.S. PATENT DOCUMENTS

| | | | |
|---|---|---|---|
| 4,551,771 | 11/1985 | Machida et al. | 360/19.1 |
| 4,583,132 | 4/1986 | Nakano et al. | 360/19.1 |
| 4,583,134 | 4/1986 | Nakamichi | 360/27 |
| 4,748,517 | 5/1988 | Shibata et al. | 358/310 |
| 4,764,822 | 8/1988 | Taniguchi et al. | 360/48 |
| 4,772,960 | 9/1988 | Takahashi et al. | 360/19.1 |
| 4,989,102 | 1/1991 | Murabayashi et al. | 360/27 |

FOREIGN PATENT DOCUMENTS

| | | |
|---|---|---|
| 173538 | 8/1985 | European Pat. Off. |
| 287376 | 4/1988 | European Pat. Off. |
| 313368 | 10/1988 | European Pat. Off. |
| 338781 | 4/1989 | European Pat. Off. |
| 366402 | 10/1989 | European Pat. Off. |
| 59-045602 | 3/1984 | Japan |
| 62-283459 | 12/1987 | Japan |
| 2-037575 | 2/1990 | Japan |

Primary Examiner—Edward P. Westin
Assistant Examiner—Benjamin D. Driscoll
Attorney, Agent, or Firm—Lewis H. Eslinger; Jay H. Maioli

[57] ABSTRACT

An apparatus for recording and reproducing a video signal and a digital audio signal, the audio signal being recorded and reproduced in either a first mode or a second mode, includes a rotary drum having a pair of rotary heads and records the video signal and selectively records the audio signal on a magnetic tape wrapped around the rotary drum. When the video signal and selected digital audio signals are reproduced, a detector detects the frequency of a predetermined portion of the reproduced signal and judges the mode of the digital audio signal on the basis of the detected frequency.

8 Claims, 14 Drawing Sheets

FIG. 3 (PRIOR ART)

| Mode | Sampling Frequency | Quantized Bit Number | Recording Bit Number | Modulation System | Track Length | Transmission Rate |
|---|---|---|---|---|---|---|
| NRML | 31.5 kHz | 10 Bits | 8 Bits Nonlinear | Bi-Phase Mark | 36° | 5.790 Mbps |
| L | 48 kHz | 16 Bits | 16 Bits Linear | 8-10 Conversion | 41° | 16.615 Mbps |
| L | 44.1 kHz | 16 Bits | 16 Bits Linear | 8-10 Conversion | 41° | 16.615 Mbps |
| L | 32 kHz | 16 Bits | 16 Bits Linear | 8-10 Conversion | 41° | 16.615 Mbps |
| N | 48 kHz | 16 Bits | 12 Bits Nonlinear | 8-10 Conversion | 41° | 13.217 Mbps |
| N | 44.1 kHz | 16 Bits | 12 Bits Nonlinear | 8-10 Conversion | 41° | 13.217 Mbps |
| N | 32 kHz | 16 Bits | 12 Bits Nonlinear | 8-10 Conversion | 41° | 13.217 Mbps |

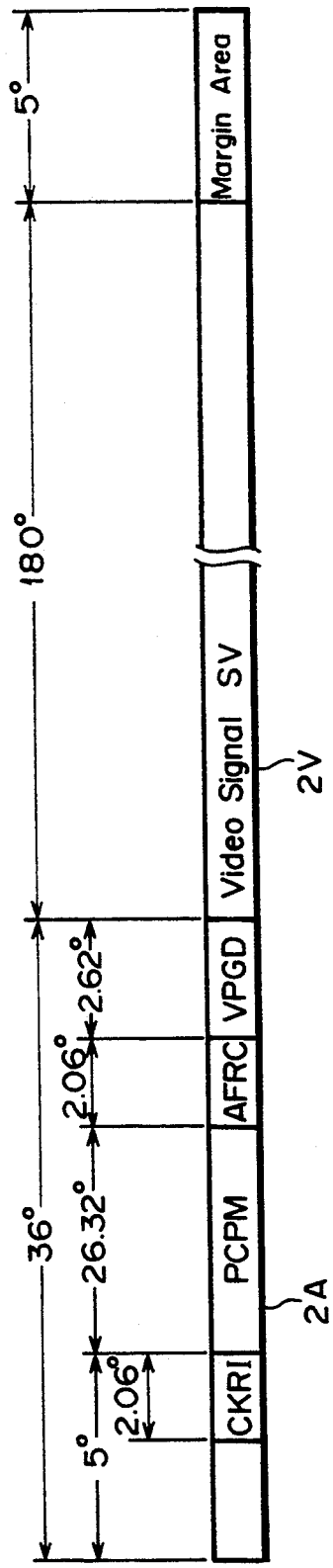
FIG. 4A  NRML Mode
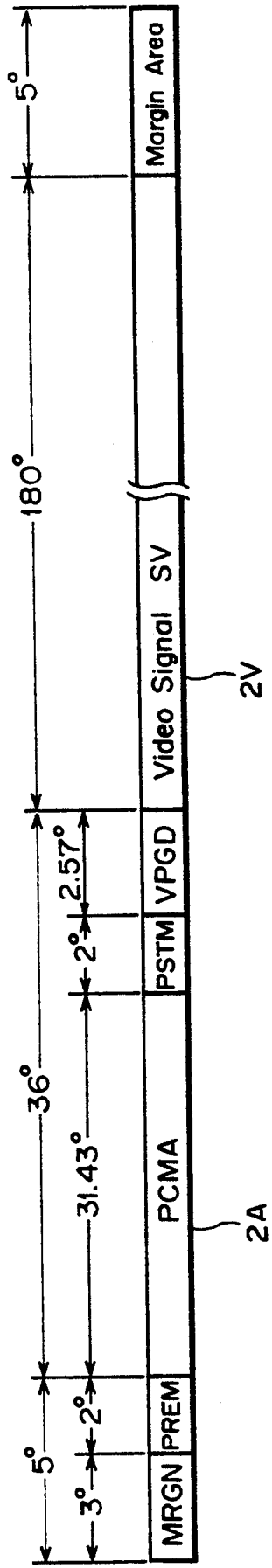
FIG. 4B  L,N Mode

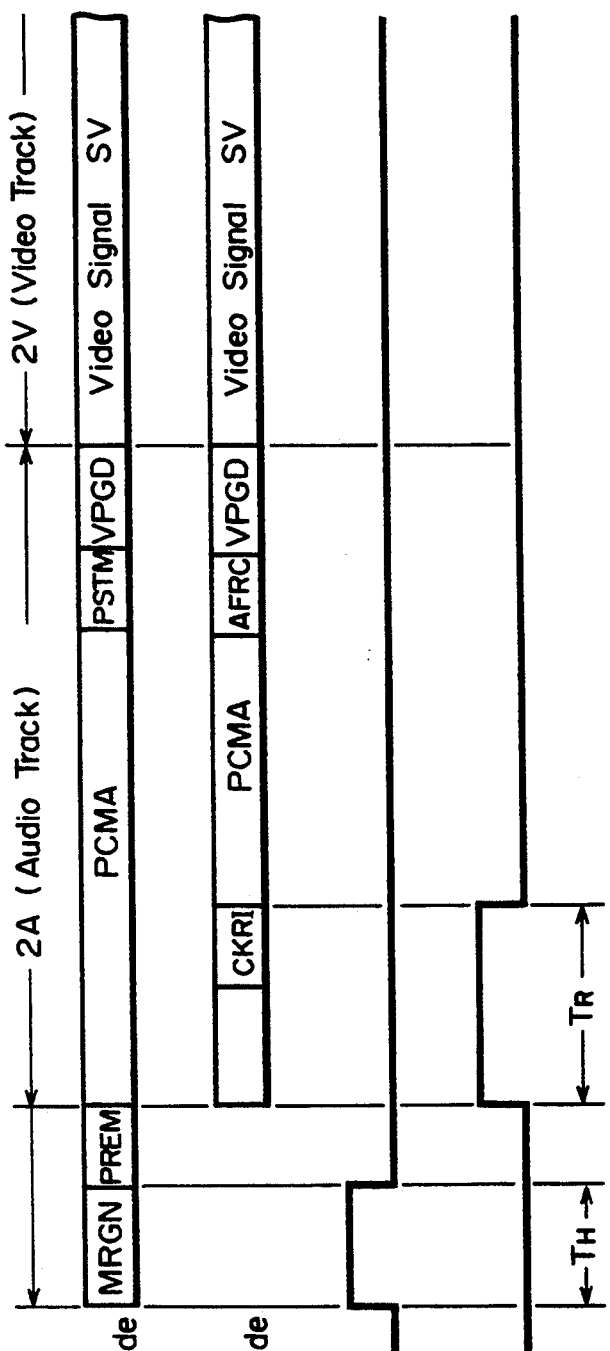

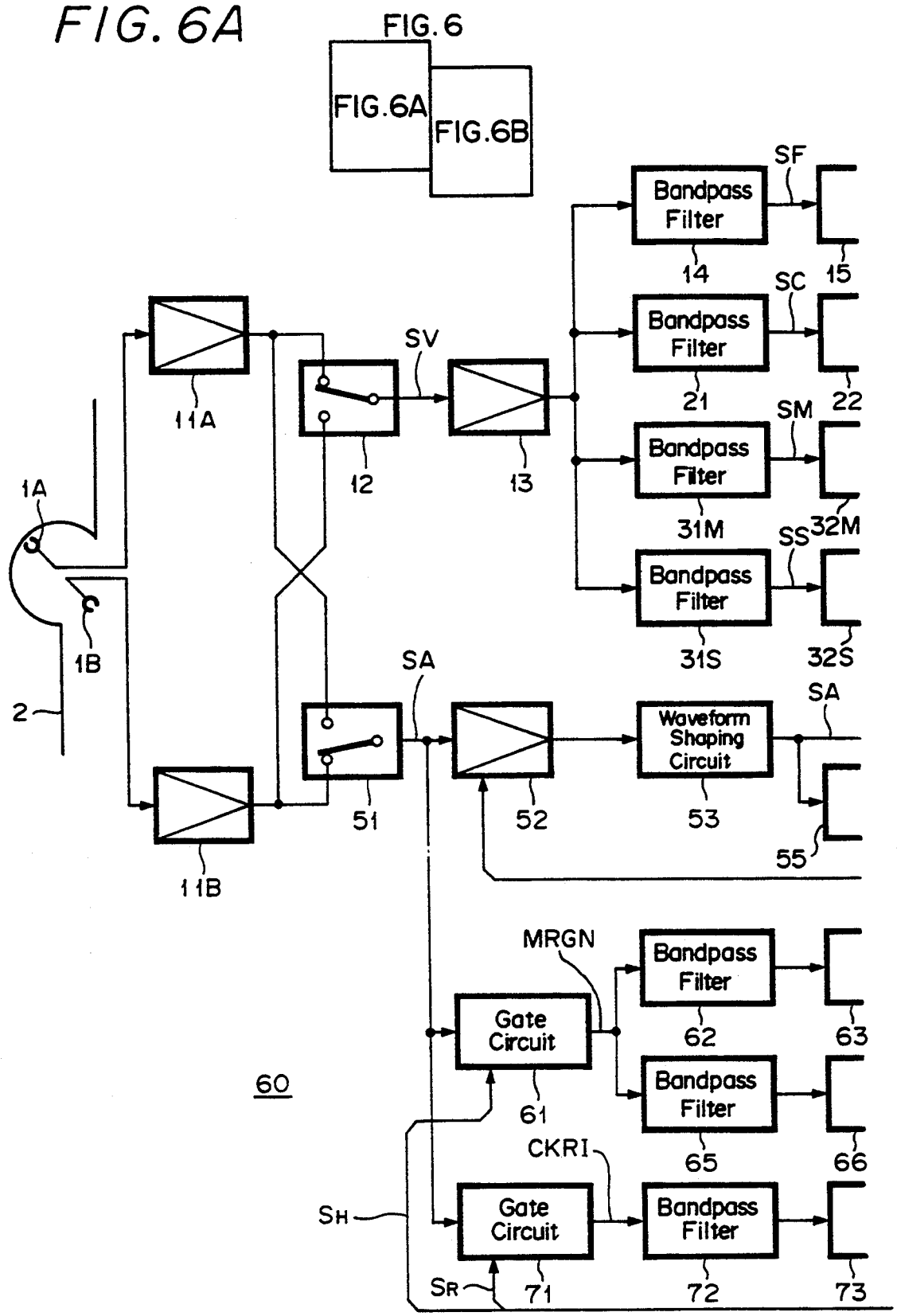

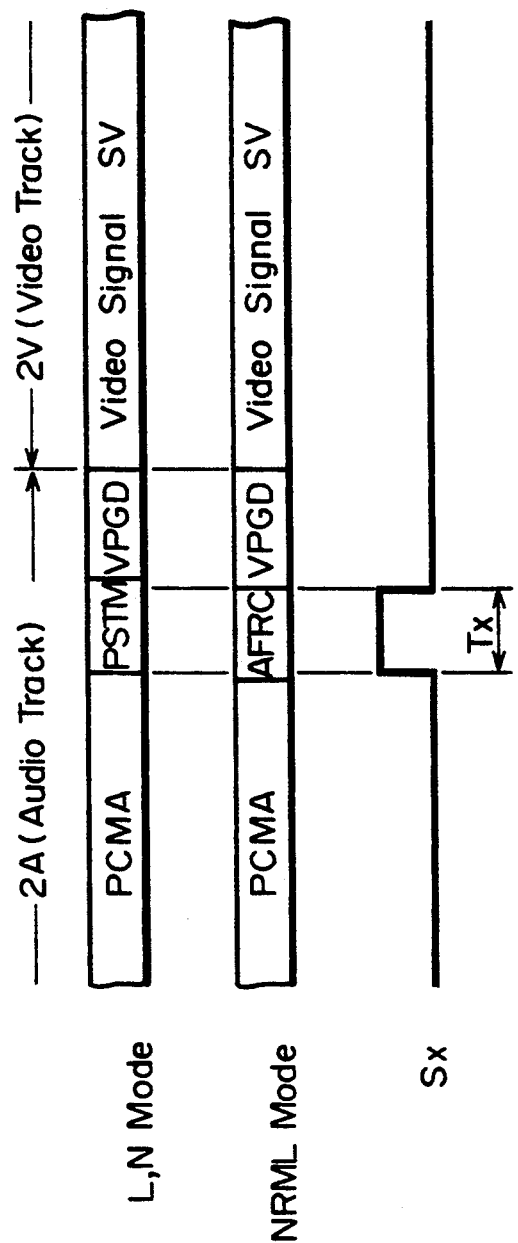

RECORDING/REPRODUCING APPARATUS FOR DETERMINING THE MODE OF A RECORDED DIGITAL AUDIO SIGNAL BY DETECTING DIFFERENT CLOCK FREQUENCIES AT SELECTED TIMES

BACKGROUND OF THE INVENTION

1. Field of the Invention

The present invention generally relates to video tape recorders and, more particularly, is directed to a so-called 8-mm video tape recorder in which recorded modes of a pulse-code modulated (PCM) audio data can be identified by checking reproduced signals recorded in the intervals adjacent to the PCM audio data.

2. Description of the Prior Art

In the 8-mm video tape recorder, the video signal is recorded as shown in FIGS. 1 and 2.

As shown in FIG. 1, a frequency-multiplexed signal SV is formed by frequency-multiplexing an FM (frequency-modulated) signal SF, FM-modulated by a video signal SY, a down-converted carrier chrominance signal SC, an FM signal SM, FM-modulated by a sum signal (L+R) of left and right channel audio signals L, R, an FM signal SS, FM-modulated by a difference signal (L−R), and a pilot signal SP used to effect tracking servo in playback mode. This frequency-multiplexed signal SV is recorded on a magnetic tape 2 as one slant video track 2V at every field period as shown in FIG. 2.

In accordance with the technology development of the 8-mm video tape recorder, the PCM audio signal is recorded in a variety of modes, such as shown in FIG. 3.

In "NRML mode", as shown on the second row of FIG. 3, the audio signal is quantized into a digital signal in which a sampling frequency is 31.5 kHz ($\approx 2$ fh where fh is the horizontal frequency) and one sample is formed of 10 bits. Then, one sample of the digital signal is nonlinearly compressed in data from 10 to 8 bits and converted into a biphase mark signal. This biphase mark signal is recorded on the magnetic tape 2 at a front over-scan interval of the video track 2V over an angular extent of 36 degrees as the track 2A as shown in FIG. 2.

In "L mode", as shown on the third row of FIG. 3, the audio signal is quantized into a digital signal in which a sampling frequency is any of 48 kHz, 44.1 kHz and 32 kHz and one sample is formed of 16 bits. This digital signal is converted in an eight-to-ten conversion fashion and the converted digital signal is then recorded on the magnetic tape 2 at a front over-scan interval of the video track 2V over an angular extent of 41 degrees as the track 2A as shown in FIG. 2.

Further, in "N mode", as shown on the fourth row of FIG. 3, one sample of the quantized digital signal is nonlinearly compressed in data in the form of 16 to 12 bits and then recorded similarly to the L mode.

In actual practice, the recorded signal involves an error correction code, an identifying (ID) code and so on and the transmission rate thereof is presented as shown in FIG. 3. Also, the recorded signal has a preamble signal, a post-amble signal and the like added thereto.

The NRML mode is the standard standardized when the 8-mm video tape recorder was introduced and the L and N modes are the standards added or expanded in accordance with the development of the 8-mm video tape recorder technology.

Since the L and N modes are new modes which are added to or expanded in the PCM audio mode of the 8-mm video tape recorder as described above, the existing high-grade video tape recorders can cope with the NRML mode, the L mode and the N mode. However, the NRML mode, the L mode and the N mode are not available in the existing standard type video tape recorders and therefore these standard type video tape recorders have no system to properly identify these modes.

OBJECTS AND SUMMARY OF THE INVENTION

Accordingly, it is an object of the present invention to provide an improved video tape recorder in which the aforementioned shortcomings and disadvantages encountered with the prior art can be eliminated.

More specifically, it is an object of the present invention to provide a video tape recorder in which recorded modes of a PCM (pulse code modulated) audio signal can be identified reliably.

It is another object of the present invention to provide a video tape recorder which is suitably applied to an 8-mm video tape recorder.

As a first aspect of the present invention, an apparatus for recording and reproducing a video signal and a digital audio signal of either a first or second mode comprises a recording device for recording the video signal and selectively recording the audio signal of a first or second mode in a slant pattern on a magnetic tape wrapped around a rotary drum having at least two rotary heads over 180 degrees, a playback device for reproducing the video signal and selected digital audio signals by the rotary heads, and a detector for detecting a frequency of a reproduced signal in a predetermined portion and judging the mode of the digital audio signal.

In accordance with a second aspect of the present invention, an apparatus is provided to reproduce a video signal and a digital audio signal of either a first or second mode recorded in a slant pattern on a magnetic tape wrapped around a rotary drum having at least two rotary heads over 180 degrees. This apparatus comprises a playback device for reproducing the video signal and selected digital audio signals by the rotary heads, and a detector for detecting a frequency of a reproduced signal in a predetermined portion and judging the mode of the digital audio signal.

The above and other objects, features and advantages of the present invention will become apparent from the following detailed description of illustrative embodiments thereof to be read in conjunction with the accompanying drawing, in which like reference numerals are used to identify the same or similar parts in the several views.

BRIEF DESCRIPTION OF THE DRAWINGS

FIG. 3 is a table showing various recording modes of the 8-mm video tape recorder and recording characteristics thereof;

FIGS. 4A and 4B are respectively diagrams of track formats and illustrating tracks of PCM audio signals recorded in the NRML mode and in the L and N modes;

FIGS. 5A through 5C are respectively diagrams of track formats and waveform diagrams to which references will be made in explaining a fundamental principle of the present invention;

FIGS. 11A, 11B and 11C are diagrams of track formats and a waveform diagram used to explain a third embodiment of the video tape recorder according to the present invention, respectively.

DETAILED DESCRIPTION OF THE PREFERRED EMBODIMENTS

Figure 1:
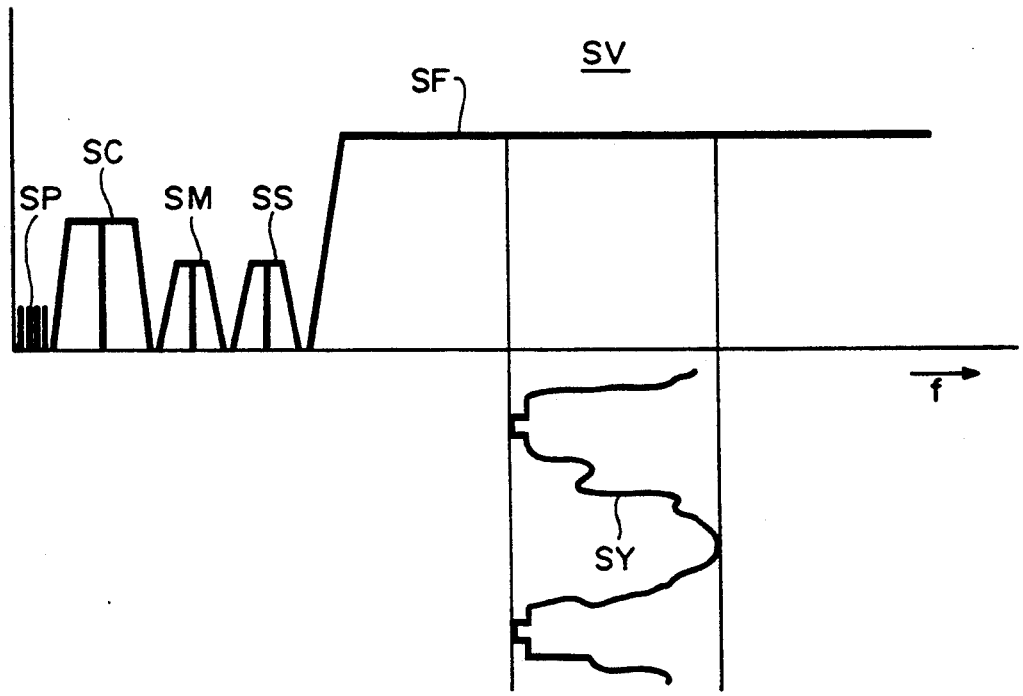
FIG. 1 is a frequency spectrum diagram showing video and audio signals recorded in the 8-mm video tape recorder.
Figure 2:
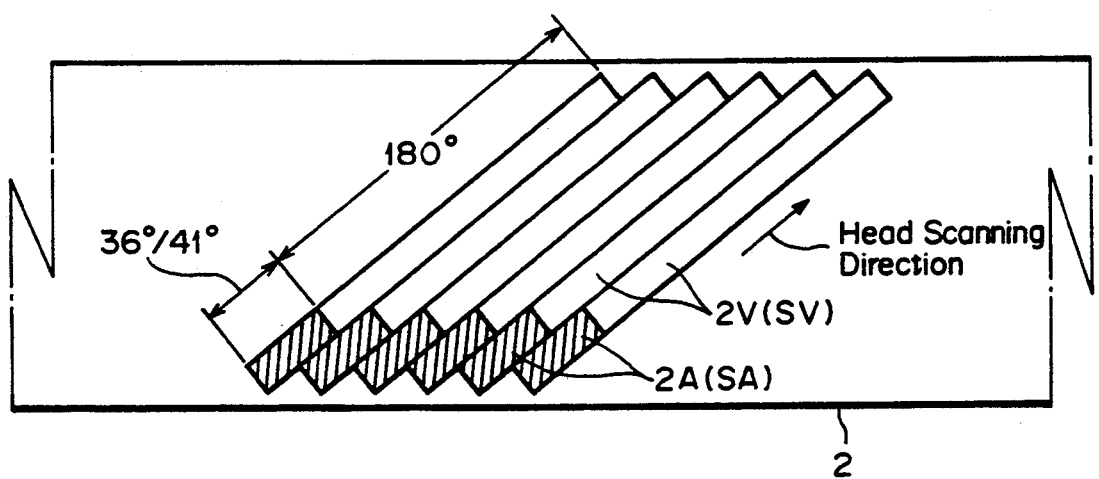
FIG. 2 is a schematic diagram of track pattern formed by the 8-mm video tape recorder.

Before describing the preferred embodiments of the present invention, let us initially describe the fundamental principle or fundamental concept of the invention with reference to FIGS. 4A, 4B and FIGS. 5A, 5B, 5C.

FIGS. 4A, 4B show the audio and video tracks 2A and 2V more in detail. FIG. 4A shows the audio and video tracks 2A and 2V provided when the PCM audio signal is recorded in the NRML mode and FIG. 4B shows the same provided when the PCM audio signal is recorded in the L mode and in the N mode. In FIGS. 4A, 4B, values are roughly estimated.

In the NRML mode (see FIG. 4A), a clock run-in area CKRI of angular extent of 2.06 degrees is provided at the rear of the area of angular extent of 5 degrees from the head and, a clock run-in signal CKRI of clock frequency 5.79 MHz (=368 fh) is recorded in this clock run-in area CKRI.

The clock run-in area CKRI is followed by an area PCMA of an angular extent of 26.32 degrees and this area PCMA is used as data area PCMA in which the original PCM audio data PCMA is recorded.

The data area PCMA is followed by an after-recording margin area AFRC of an angular extent of 2.06 degrees in which the after-recording margin signal AFRC of the clock frequency is recorded. The after-recording margin area AFRC is followed by a guard area VPGD of an angular extent of 2.62 degrees which adjoins the video track 2V. The PCM audio track 2A is ended with the guard area VPGD and followed by the video track 2V.

In the L mode and N mode (see FIG. 4B), the margin interval MRGN is started from the head of the track 2A in an angular range of 3 degrees. The margin signal MRGN of the frequency a half of the clock frequency is recorded on the margin interval MRGN (clock frequency is 1056 fh in the L mode and 840 fh in the N mode). The margin area MRGN is followed by the pre-amble area PREM of an angular extent of 2 degrees in which the pre-amble signal PREM of the predetermined bit pattern is recorded.

The preamble area PREM is followed by a data area PCMA of an angular extent of 31.43 degrees in which the original PCM audio data PCMA is recorded.

Further, the data area PCMA is followed by a post-amble area PSTM of an angular extent of 2 degrees in which the post-amble signal PSTM having the frequency a half of the clock frequency, that is, 8.3 MHz in the L mode and 6.6 MHz in the N mode is recorded. The post-amble area PSTM is followed by the guard area VPGD of an angular extent of 2.57 degrees which draws a line between the PCM audio track 2A and the video track 2V. The PCM audio track 2A is ended by the guard area VPGD which is then followed by the video track 2V.

Thus, if the track 2A of the L mode (and the N mode) and the track 2A of the NRML mode are arranged with reference to the position of the video track 2V, then they become as shown in FIG. 5A. From FIG. 5A, it is clear that, of the track 2A of the L mode, the audio data area PCMA corresponds with the clock run-in area CKRI of the track 2A of the NRML mode and the PCM audio signal PCMA is recorded on the audio data area PCMA.

In the audio track 2A of the NRML mode, the area corresponding to the margin area MRGN of the track 2A of the L mode is not yet started in the track 2A of the NRML mode.

A first embodiment of the video tape recorder according to the present invention will be described hereinbelow.

Figure 6B:
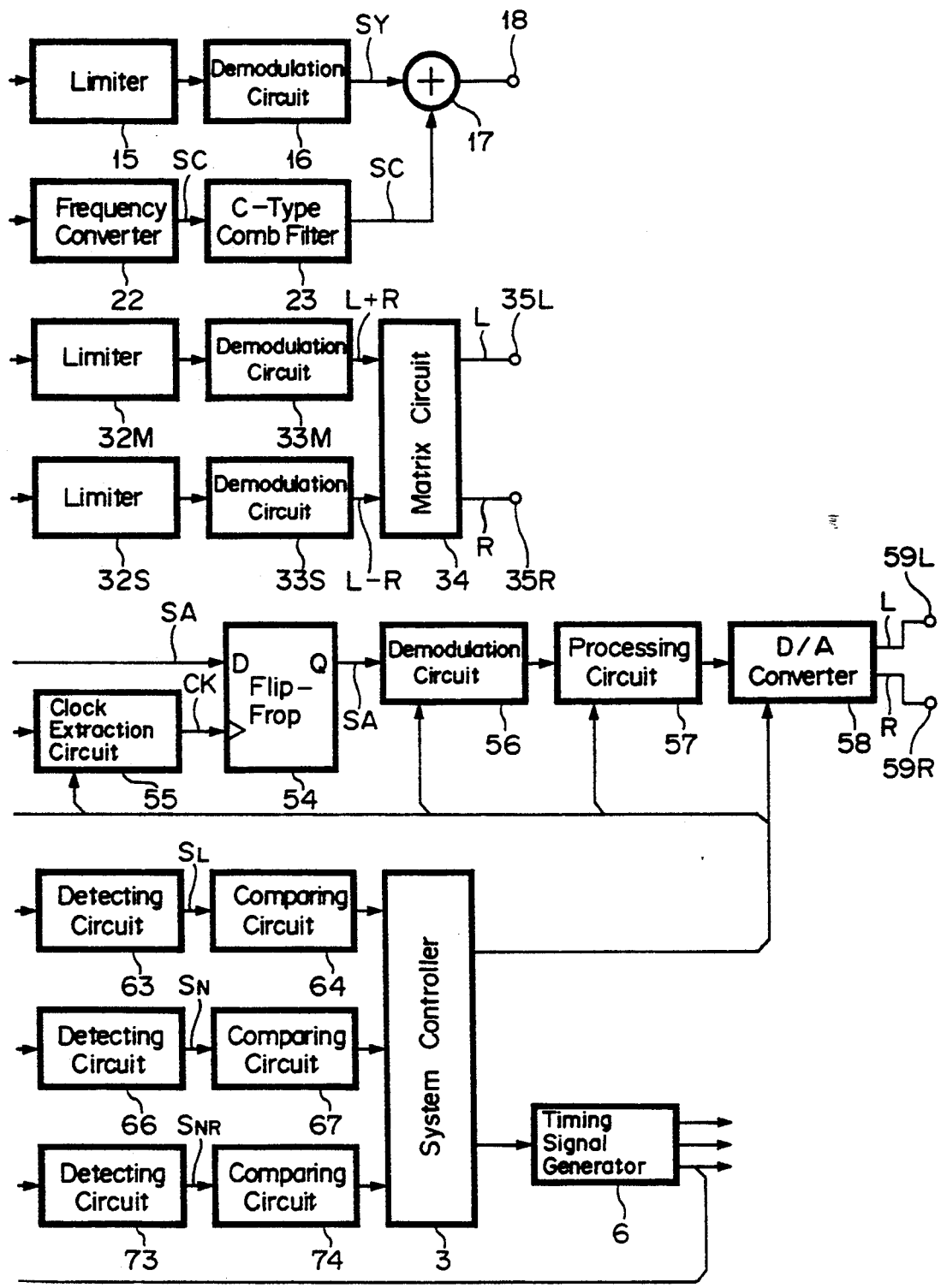
FIG. 6 (formed of FIGS. 6A and 6B) is a schematic block diagram showing a first embodiment of the video tape recorder according to the present invention.

As shown in FIG. 6, there are provided rotary magnetic heads 1A and 1B which are rotated at a frame frequency by a servo circuit (not shown). A magnetic tape 2 is obliquely wrapped around the circumferential surfaces of the rotary magnetic heads 1A and 1B over an angular extent of slightly larger than 221 degrees and transported at a constant speed. The magnetic tape 2 has tracks 2A and 2V formed thereon as explained in connection with FIG. 11 and in the following description, a signal on the track 2A will be generally referred to as a digital signal SA.

As shown in FIG. 6, a system controller 3 is formed of a microcomputer and supplies control signals to circuits, which will be described later, to thereby control the entirety of the video tape recorder.

A timing signal generating circuit 6 is adapted to receive an output from the system controller 3 and to generate various clocks and timing signals synchronized with the video signal and these clocks and timing signals are fed to respective circuits.

The signals SA and SV are alternately reproduced from the magnetic tape 2 at every field period by the rotary heads 1A and 1B. These signals SA and SV are supplied through head amplifiers 11A and 11B to a switching circuit 12 and the control signal from the generating circuit 6 also is supplied to the switching circuit 12 so that the switching circuit 12 derives continuously the signal SV of every field period.

The signal SV is supplied through a reproducing equalizer amplifier 13 to a bandpass filter 14, from which there is derived an FM luminance signal SF. The FM luminance signal SF is supplied through a limiter 15 to an FM demodulator circuit 16 which then demodulates the luminance signal SY. This luminance signal SY is fed to an adding circuit 17.

The signal SV from the amplifier 13 is supplied to a bandpass filter 21, from which there is derived a carrier chrominance signal SC. The carrier chrominance signal SC is supplied to a frequency converter 22, in which it is reconverted into the carrier chrominance signal SC of original carrier frequency and phase. This carrier chrominance signal SC is supplied to a C-type comb filter 23, in which a cross-talk component between adjacent tracks is removed from the carrier chrominance signal SC and fed to the adding circuit 17. Accordingly, the adding circuit 17 derives the original color composite video signal of the NTSC system, which is then fed to an output terminal 18.

The signal SV from the amplifier 13 is supplied to a bandpass filter 31M which then derives an FM signal SM. The FM signal SM is supplied through a limiter 32M to an FM demodulating circuit 33M, in which it is demodulated to provide a sum signal (L+R). The sum signal (L+R) is supplied to a matrix circuit 34.

The signal SV from the amplifier 13 is supplied to a bandpass filter 31S which then derives an FM signal SS. The FM signal SS is supplied through a limiter 32S to an FM demodulating circuit 33S, in which it is demodulated to provide a difference signal (L−R). The difference signal (−R) is supplied to the matrix circuit 34.

In this fashion, the left and right channel audio signals L and R are produced from the matrix circuit 34 and these signals L and R are fed to terminals 35L and 35R, respectively.

The signal SA from the head amplifiers 11A, 11B is supplied to a switching circuit 51 and the control signal from the generating circuit 6 is supplied to the switching circuit 51 so that the switching circuit 51 derives the digital signal SA at every field period. The digital signal SA is supplied through a playback amplifier 52 and a waveform-shaping circuit 53 to a data input terminal of a D flip-flop 54.

The signal SA from the waveform-shaping circuit 53 is supplied to a clock extracting circuit 55 formed of, for example, a phase locked loop (PLL), in which a clock CK is extracted from the signal SA. This clock CK is supplied to a clock input terminal of the D flip-flop 54 so that the D flip-flop 54 derives the signal SA synchronized with the clock CK.

The thus produced signal SA is converted in the form of 10 to 8 bits (10-to-8 conversion) by a demodulating circuit 56 in the opposite manner to the recording mode. Then, the thus converted signal SA is supplied to a playback processor circuit 57, in which it is error-corrected, timebase-expanded and so on, thereby produced as the original digital audio data.

The digital audio data is supplied to a digital-to-analog (D/A) converter 58, in which it is converted into the original left and right channel audio signals L and R. These left and right audio signals L and R are fed to terminals 59L and 59R, respectively.

A mode identifying circuit 60 identifies the mode of the digital signal SA reproduced from the track 2A from the NRML mode, the L mode and the N mode as follows.

That is, the digital signal SA from the switching circuit 51 is supplied to a gate circuit 61 and the generating circuit 6 derives a signal SH (see FIG. 5B) which goes high "1" level during a period TH when the heads 1A, 1B scan the margin interval MRGN of the track 2A in the L or N mode. The signal SH is supplied to the gate circuit 61 as the control signal. Thus when the PCM audio signal is recorded in the L or N mode, the gate circuit 61 derives the margin signal MRGN.

The margin signal MRGN is supplied through a bandpass filter 62 to a detecting circuit 63. The bandpass filter 62 has a pass band of the frequency half the clock frequency of the L mode, i.e., the frequency of the margin signal MRGN of the L mode so that, if the PCM audio signal is recorded in the L mode, then the detecting circuit 63 derives a signal SL indicative of the level of the margin signal MRGN.

The signal SL is supplied to the system controller through a level comparator circuit 64. The level comparator circuit 64 is adapted to make the margin signal MRGN effective when the level of the signal SL is higher than a predetermined value.

The margin signal MRGN from the gate circuit 61 is supplied through a bandpass filter 65 to a detecting circuit 66. The bandpass filter 65 has a pass band of the frequency half the clock frequency of the N mode, i.e., the frequency of the margin signal MRGN of the N mode so that, if the PCM audio signal is recorded in the N mode, the detecting circuit 66 derives a signal SN indicative of the level of the margin signal MRGN.

The signal SN is supplied to the system controller 3 through a level comparator circuit 67.

The digital signal SA from the switching circuit 51 is further supplied to a gate circuit 71 and the generating circuit 6 derives a signal SR (see FIG. 5C) which goes high "1" level during the period TR where the heads 1A, 1B scan the clock run-in interval CKRI of the track 2A in the NRML mode. The signal SR is supplied to the gate circuit 71 as a control signal.

Thus, when the PCM audio signal is recorded in the NRML mode, the gate circuit 71 derives the clock run-in signal CKRI.

The clock run-in signal CKRI is supplied through a bandpass filter 72 to a detecting circuit 73. The bandpass filter 72 has a pass band of the clock frequency of the NRML mode, that is, the frequency of the clock run-in signal CRKI so that, if the PCM audio signal is recorded in the NRML mode, the detecting circuit 73 derives a signal SNR indicative of the level of the clock run-in signal CKRI, which is then fed to the system controller 3 via a level comparator circuit 74.

Then, the system controller 3 identifies on the basis of the signals SL, SN, SNR from the level comparator circuits 64, 67, 74 the recorded mode of the reproduced PCM audio signal from the NRML mode, the L mode and the N mode, and switches by the identified output the reproducing equalizer characteristic of the playback amplifier 52, the extracting characteristic of the clock extracting circuit 55, the demodulating characteristic of the demodulating circuit 56, the processing characteristic such as the error-correcting characteristic or the like of the processor circuit 57 and the converting characteristic of the converter 58 to those associated with the mode of the recording mode.

In this fashion, the PCM audio signal is correctly reproduced with the corresponding characteristic regardless of whether the PCM signal is recorded in any mode of the NRML mode, the L mode or the N mode.

Figure 7:
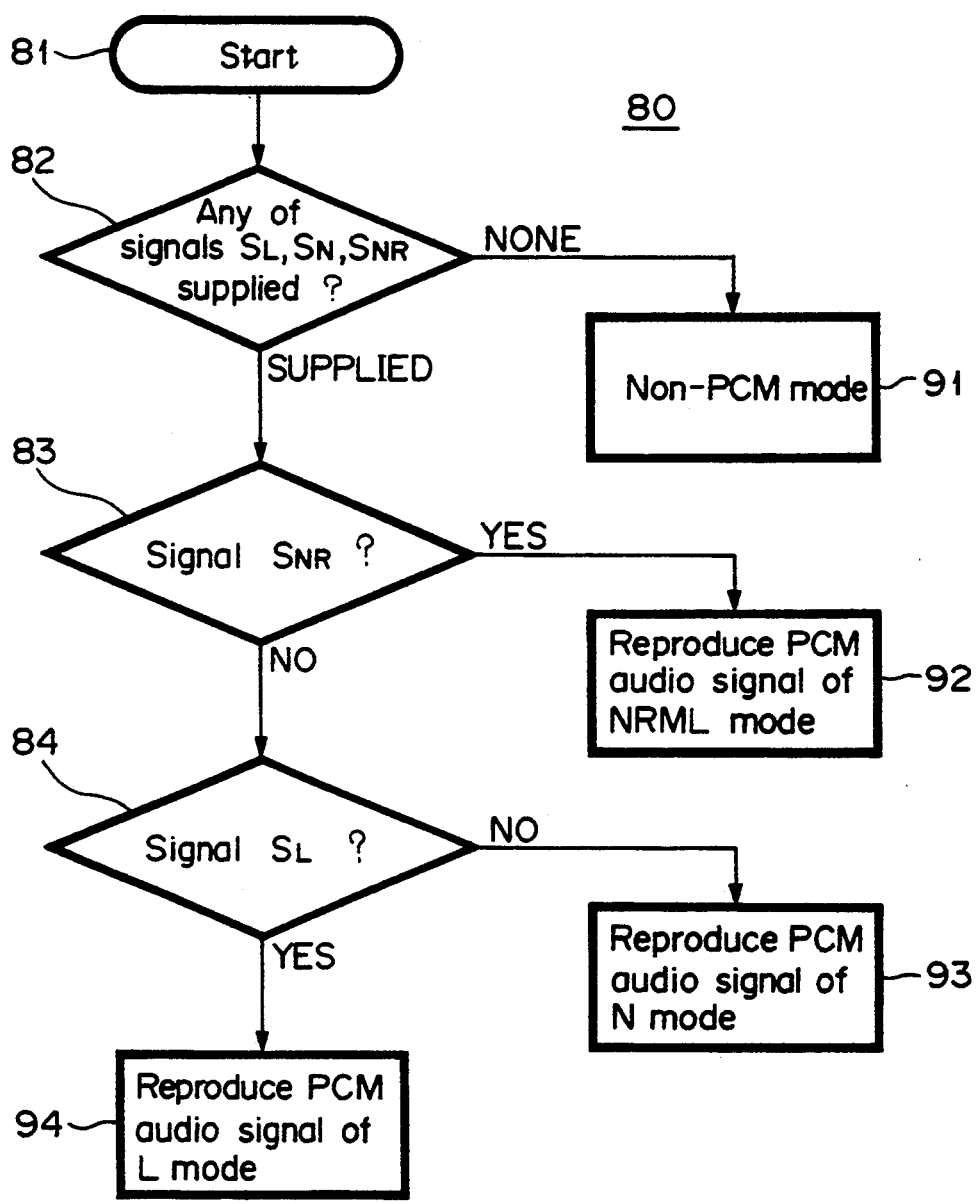
FIG. 7 is a flowchart of a routine for identifying the recorded mode of a reproduced PCM audio signal and, to which references will be made in explaining operation of the present invention.

FIG. 7 shows an example of an identifying routine 80 in which the system controller 3 identifies the recorded mode of the PCM audio signal, reproduced from the signals SL, SN, SNR, from the NRML mode, the L mode and the N mode.

Referring to FIG. 7, the processing of the system controller 3 begins with step 81 in the routine 80 and it is determined in the next decision step 82 whether or not any of the signals SL, SN, SNR is supplied. If none of them is supplied as represented by a NONE at decision step 82, then the processing proceeds from step 82 to step 91. In step 91, the muting signal is supplied from the system controller 3 to, for example, the converter 58 so that the outputs at the terminals 59L, 59R are muted, thereby the video tape recorder being placed in the modes other than the PCM playback mode.

If any of the signals SL, SN and SNR is supplied at decision step 82, then the processing proceeds from step 82 to the next decision step 83. It is determined in decision step 83 whether or not the signal supplied is the signal SNR. If it is the signal SNR as represented by a YES at decision step 83, then the processing proceeds from step 83 to step 92. In step 92, the characteristics of the circuits 52, 55 to 58 are switched to the characteristics associated with the NRML mode by the system controller 3, thereby the PCM audio signal of the NRML mode being reproduced.

If the signal supplied is not the signal SNR at step 83, then the processing proceeds from step 83 to the next decision step 84. It is determined in decision step 84 whether or not the signal supplied is the signal SL. If it is not the signal SL as represented by a NO at decision step 84, then the processing proceeds from step 84 to step 93, whereat the characteristics of the circuits 52, 55 to 58 are switched to the characteristics associated with the N mode by the system controller 3, thereby the PCM audio signal of the N mode being reproduced.

If on the other hand the signal supplied is the signal SL as represented by a YES at decision step 84, then the processing proceeds from step 84 to step 94. In step 94, the characteristics of the circuits 52, 55 to 58 are switched to the characteristics associated with the L mode by the system controller 3, thereby the PCM audio signal of the L mode being reproduced.

Figure 8:
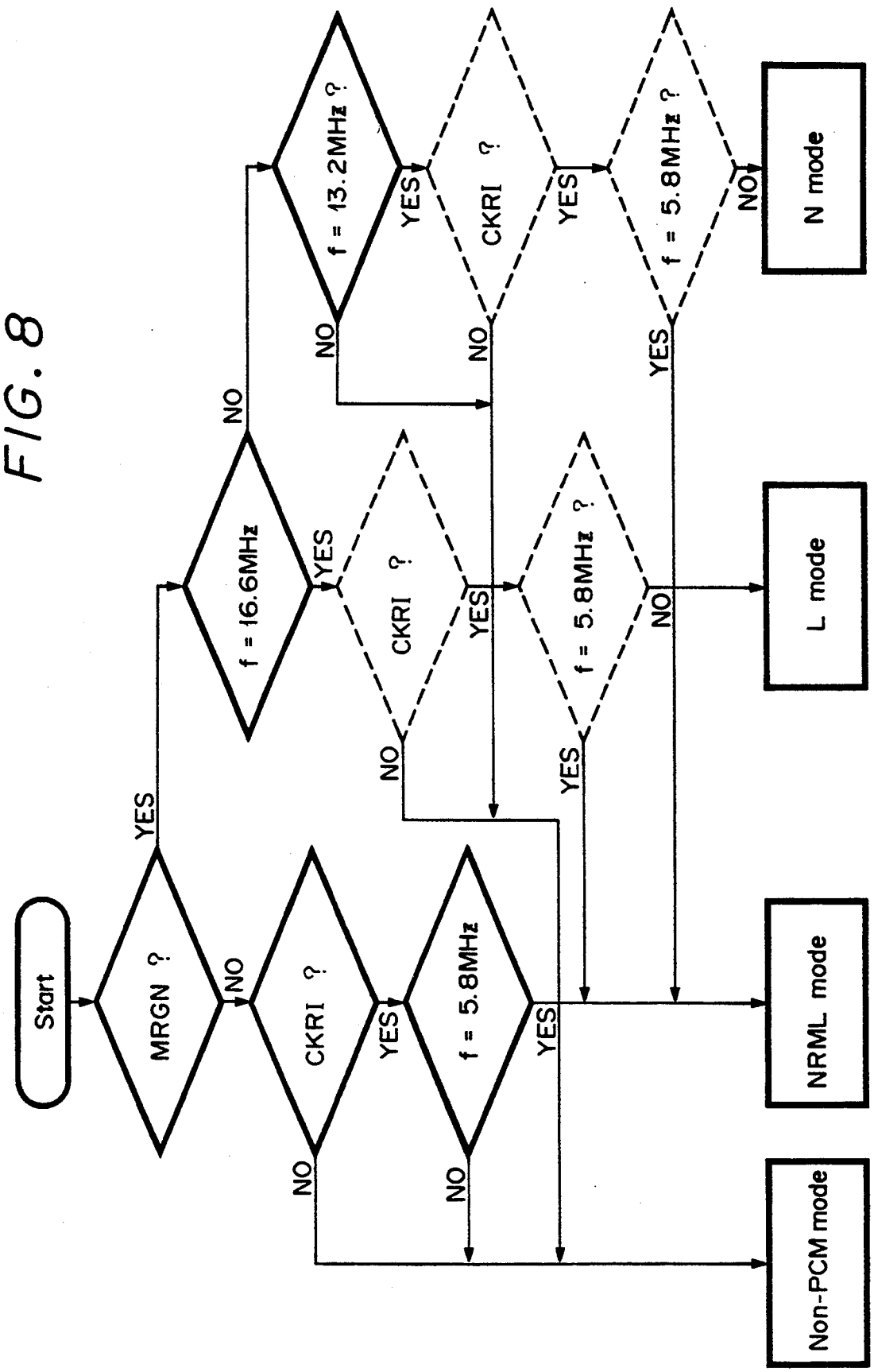
FIGS. 8 and 9 are system flowcharts to which references will be made in explaining operation of the present invention, respectively.

FIG. 8 shows an example of a system flowchart used to identify the recorded mode of the PCM audio signal. Steps shown by dashed triangular blocks in FIG. 8 are used to avoid mal-function caused when the signal is not fully erased in the after-recording of long time mode by a video tape recorder having no rotary erase head.

Figure 9:
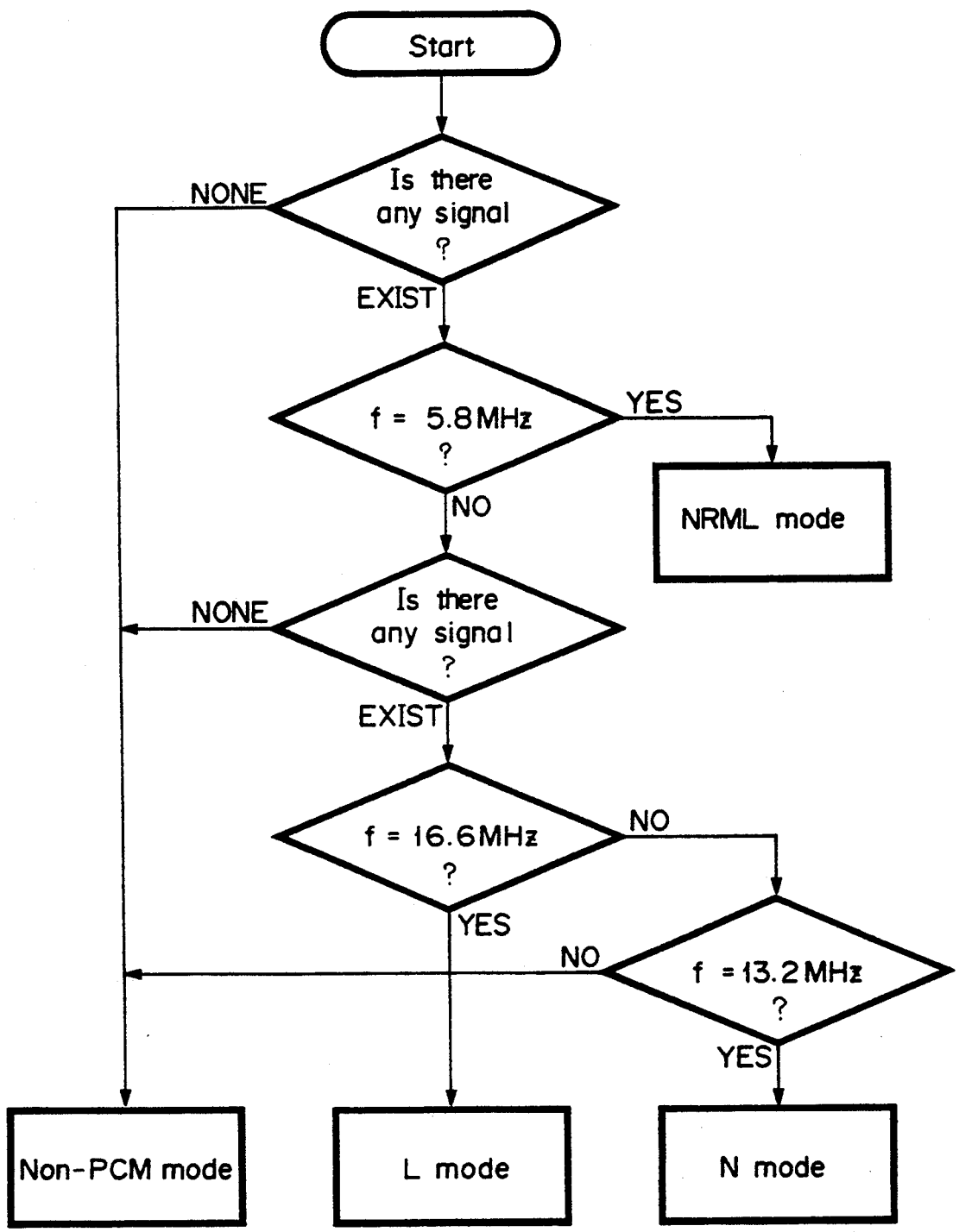

FIG. 9 shows another example of the system flowchart used to identify the recorded mode of the PCM audio signal.

As described above, according to this invention, the recorded mode of the PCM audio signal can be identified. Particularly, in accordance with this invention, since the signal component existing during particular periods TH, TR is extracted from the converted signal SA which was just reproduced and the extracted signal component is used to directly identify the recorded mode of the PCM audio signal, the reproducing equalizer characteristic of the playback amplifier 52, the extracting characteristic of the clock extracting circuit 55, the demodulating characteristic of the demodulating circuit 56, the processing characteristics such as the error-correcting characteristic or the like of the processor circuit 57 and the converting characteristic of the converter 58 can be changed with ease in response to the recorded mode of the PCM audio signal.

While the signal used to identify the recorded mode is the signal having the frequency of 8.3 MHz which is a half of the transmission rate, the margin signal MRGN having the frequency of 6.6 MHz or the signal having the frequency of the transmission rate, the clock run-in interval CKRI of low clock frequency of 5.8 MHz may be detected and used to identify the recorded mode of the PCM audio signal, thus obtaining a high reliability.

FIG. 10 shows a second embodiment of the present invention in which the waveform-shaping circuit 53 is shown more in detail and the bandpass filter 62 and the detecting circuit 63 are modified. In FIG. 10, like parts corresponding to those of FIG. 6 are marked with the same references and therefore need not be described in detail.

Figure 10A:
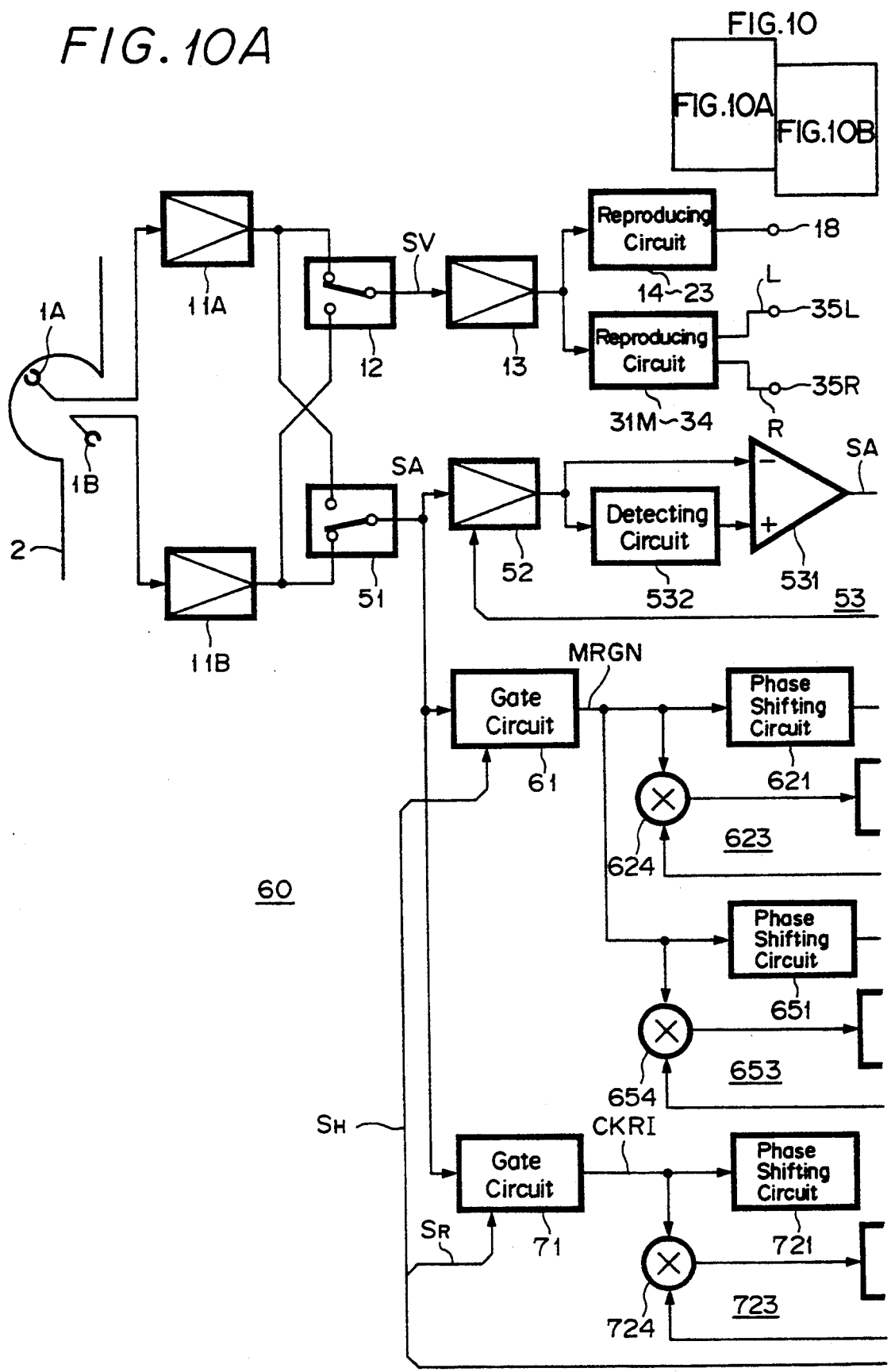
FIG. 10 (formed of FIGS. 10A and 10B) is a schematic block diagram showing a second embodiment of the video tape recorder according to the present invention and illustrating a concrete example of a waveform-shaping circuit and modified examples of a filter and a detector circuit.
Figure 10B:
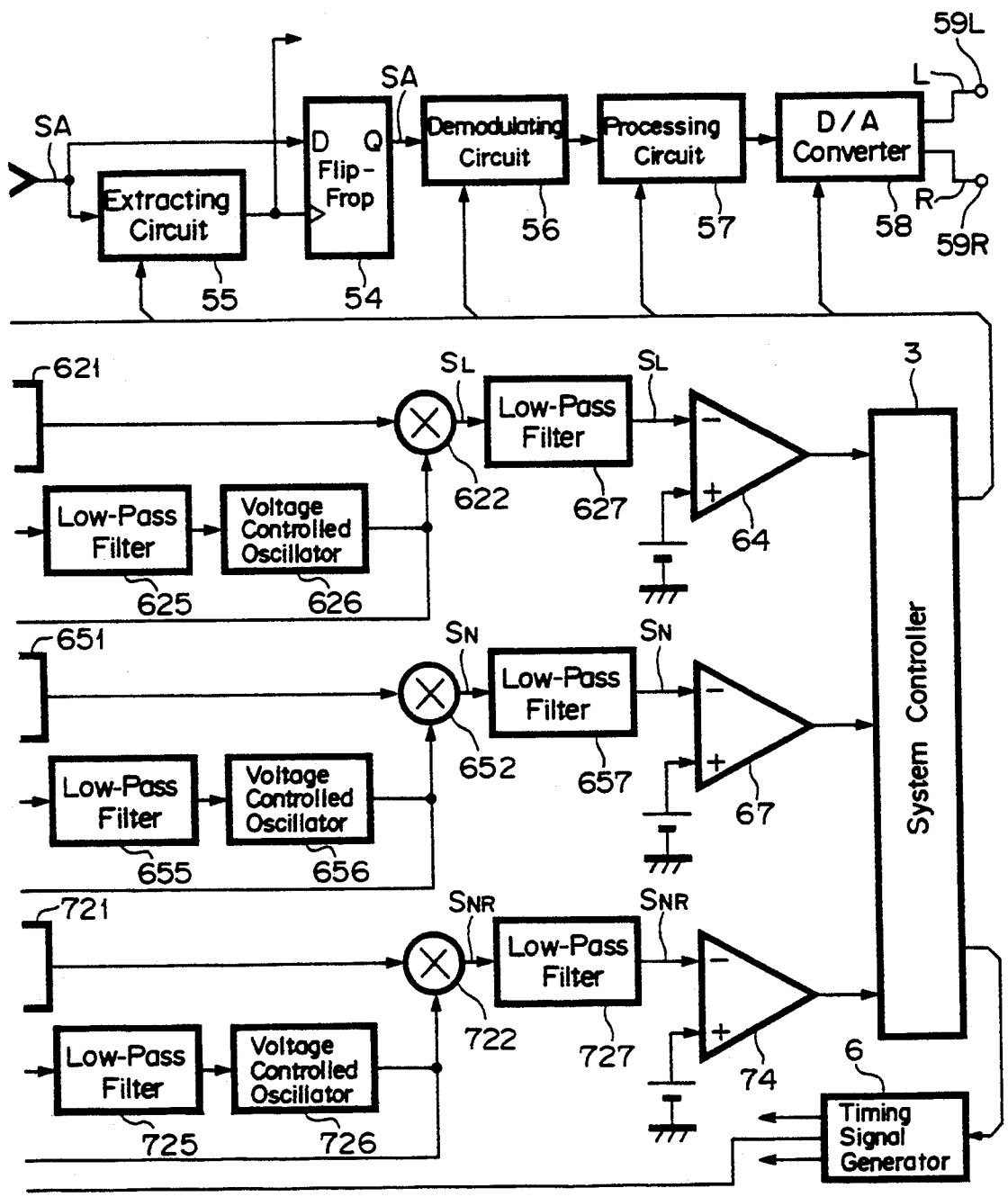

Referring to FIG. 10 (formed of FIGS. 10A and 10B), the signal SA from the playback amplifier 52 is supplied to a voltage comparator circuit 531 and is also supplied to a DC level detecting circuit 532 which detects the DC level of the signal SA. The detected output therefrom is supplied to the voltage comparator circuit 531 so that the comparator circuit 531 derives the waveform-shaped signal SA.

The margin signal MRGN from the gate circuit 61 is supplied to a phase-shifter circuit 621, in which it is advanced in phase by $\pi/2$. The thus phase-shifted signal MRGN is supplied to a synchronizing detecting circuit (multiplying circuit) 622.

Further, the signal MRGN from the gate circuit 61 is supplied to a phase comparator circuit (multiplying circuit) 624. The phase comparator circuit 624, a low-pass filter (LPF) 625 and a voltage controlled oscillator (VCO) 626 constitute a phase locked loop (PLL) 623. The VCO 623 derives an oscillation signal of a free-running frequency of 8.3 MHz equal to the margin signal MRGN of the L mode. This oscillation signal is supplied to the comparator circuit 624 and, the compared output of the comparator circuit 624 is supplied through the low-pass filter 625 to the VCO 626 as a control signal. Then, the VCO 626 derives the oscillation signal of mean frequency and phase synchronized with the margin signal MRGN. This oscillation signal is supplied to the detecting circuit 622 as a reference signal. Accordingly, the detecting circuit 622 derives a detected output SL in response to the margin signal MRGN from the gate circuit 61. The detected output SL is supplied through a low-pass filter 627 to the level comparator circuit 64.

Because the filters 65, 72 and the detecting circuits 66, 73 are constructed similarly to the filter 62 and the detecting circuit 63, circuits corresponding to the circuits 621 to 627 are marked with reference numerals 651 to 657 and 721 to 727 and need not be described. In that case, the free-running frequencies of the VCOs 656 and 726 are selected to be the frequency of the margin signal MRGN of the N mode, i.e., 6.6 MHz and the frequency of the clock run-in frequency CKRI of the NRML mode, i.e., 5.8 MHz, respectively.

FIG. 11A illustrates the PCM audio data interval PCMA and other portions under the condition such that the L mode (and N mode) track 2A and the NRML mode track 2A are arranged with reference to the video track 2V. The postamble interval PSTM of the L mode track 2A and the after-recording margin interval AFRC of the NRML mode track 2A substantially overlap each other. The signal frequencies are constant in these intervals PSTM and AFRC but these signals frequencies are different from each other.

Figure 12A:
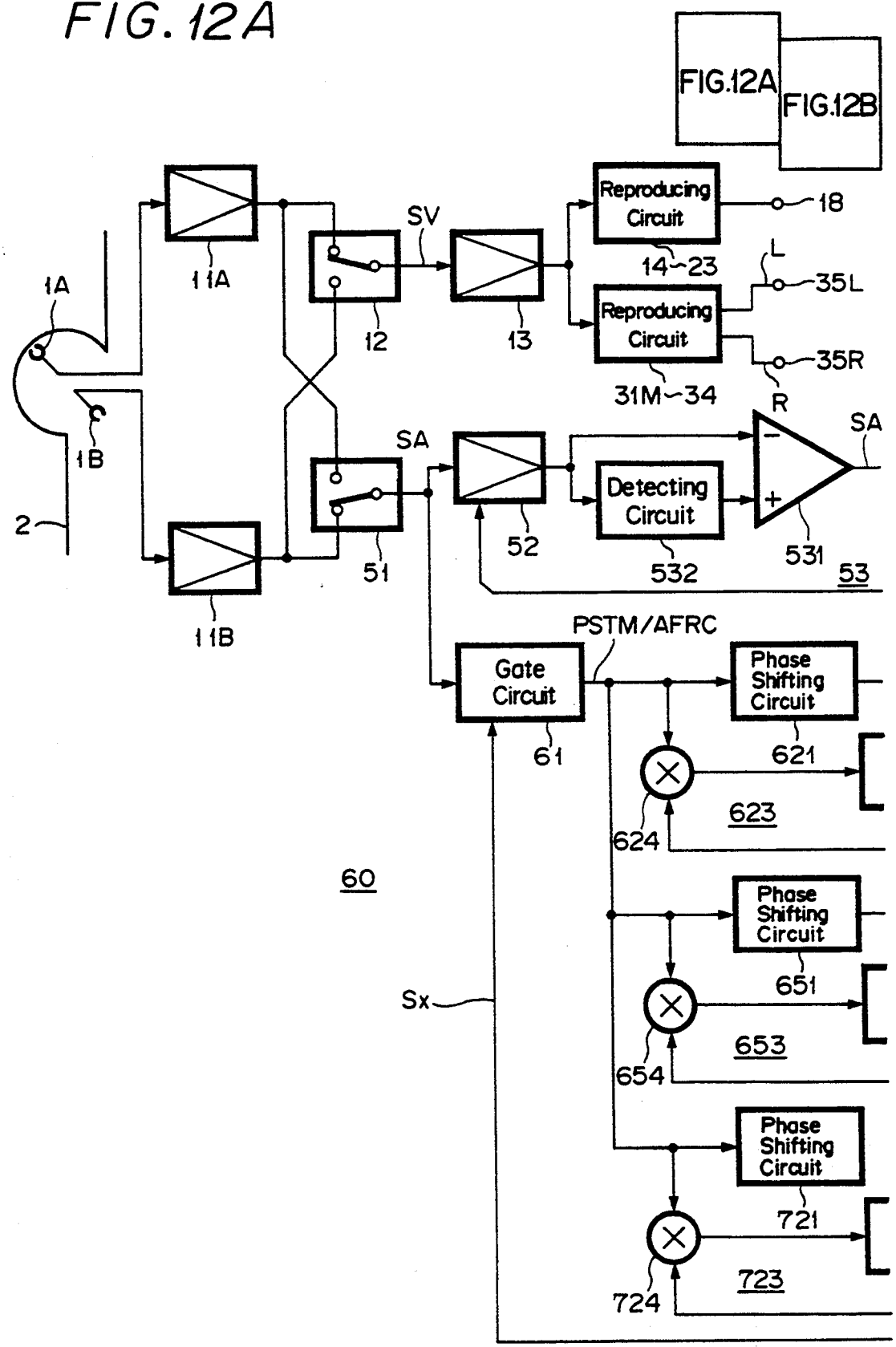
FIG. 12 (formed of FIGS. 12A and 12B) is a schematic block diagram showing a third embodiment of the video tape recorder according to the present invention.
Figure 12B:
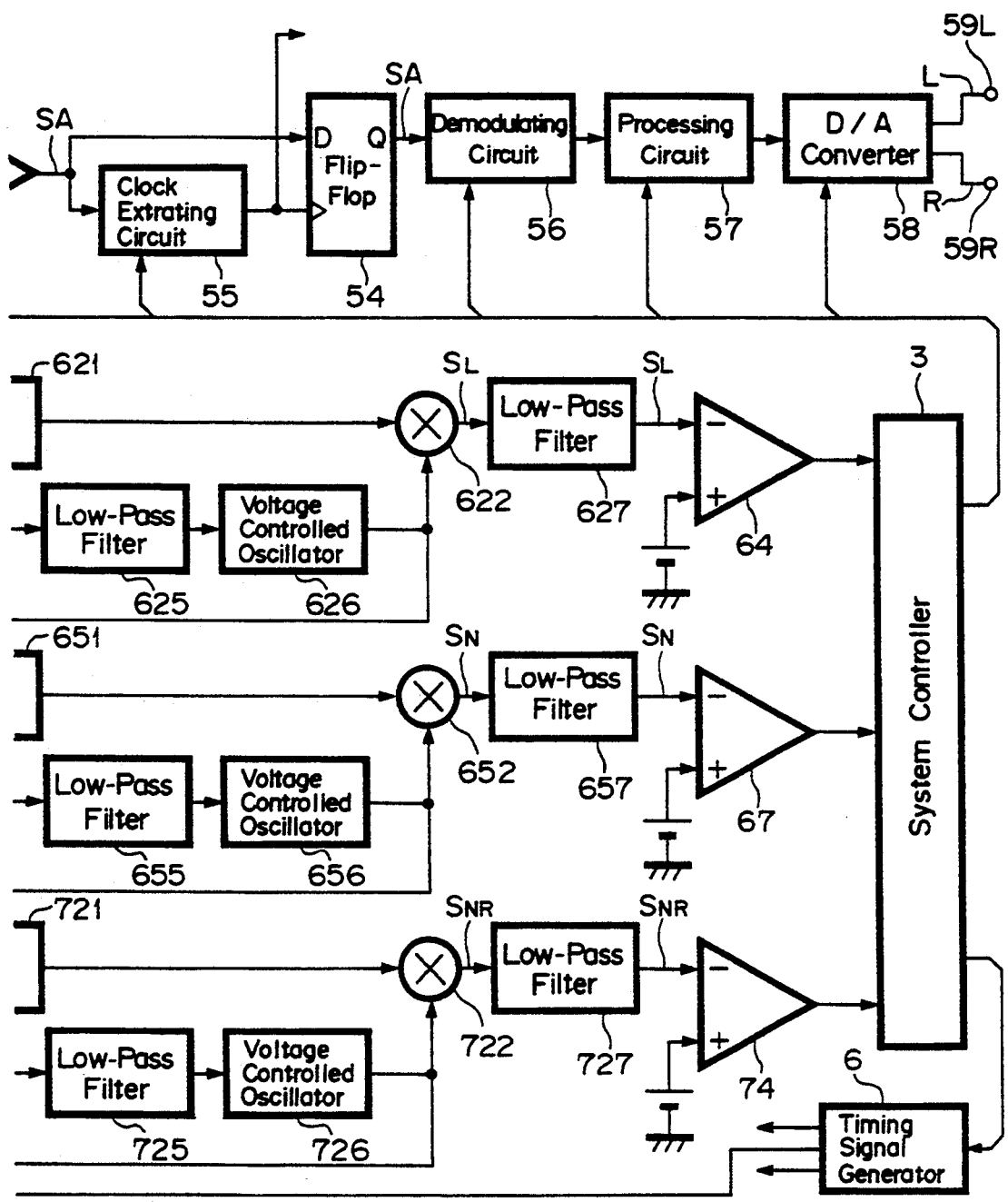

In a third embodiment of FIG. 12 (formed of FIGS. 12A and 12B), the recorded mode of the PCM audio signal is identified on the basis of a difference between the frequency components of the postamble interval PSTM and the after-recording margin interval AFRC. In FIG. 12, like parts corresponding to those of FIG. 10 are marked with the same references and therefore need not be described.

The modulated signal SA from the switching circuit 51 is supplied to the gate circuit 61 and the generating circuit 6 derives a signal Sx which goes high "1" level during the period TX where the heads 1A, 1B scan the common interval between the after-recording margin interval AFRC and the postamble interval PSTM as shown in FIG. 11B. The signal Sx is supplied to the gate circuit 61 as a control signal.

Thus, the gate circuit 61 derives the postamble signal PSTM when the PCM audio signal is recorded in the L mode or N mode and the after-recording margin signal AFRC when the PCM audio signal is recorded in the NRML mode.

The thus produced signal PSTM or AFRC is supplied to the phase-shifting circuits 621, 651 and the PLLs 623, 653 and 723 which are constructed similarly to FIG. 10 and from which there is derived the signal SL, SN or SNR. Then, the signal SL, SN or SNR is supplied to the system controller 3 which identifies the recorded mode of the PCM audio signal and, the characteristics of the circuits 52 and 55 to 58 are changed in accordance with the identified results.

The detecting period TH may be selected to be the period in which the heads 1A, 1B scan the interval PREM and the detecting period TR may be limited to the period in which the heads 1A, 1B scan the interval CKRI.

Further, upon recording, the luminance signal SY is converted into the FM signal SF in the standard mode or the high band mode depending on the occupied frequency band of the FM signal SF. If a combination of the recording mode of the PCM audio signal and the recording mode of the luminance signal SY is fixed such as when the luminance signal SY is recorded in the high band mode while the PCM audio signal is recorded in the L mode or the N mode and when the luminance signal SY is recorded in the standard mode while the PCM audio signal is recorded in the NRML mode, then the characteristics of the demodulating circuit 16 or the like can be changed to associated characteristics together with the characteristics of the circuits 52 and 55 to 58 by the identified output of the system controller 3.

According to the present invention, since the signal components existing in the particular periods TH, TR are extracted from the converted signal SA reproduced just before and the recording mode is directly identified on the basis of the thus extracted signal component, the playback equalizer characteristic of the playback amplifier 52, the extracting characteristic of the clock extracting circuit 55, the demodulating characteristic of the demodulating circuit 56, the processing characteristic such as the error-correction characteristic or the like of the processing circuit 57 and the conversion characteristic of the converter 58 can be varied with ease in association with the recording modes.

Furthermore, since the signal used to identify the mode may detect the signal MRGN having the frequency of 8.3 MHz a half of the transmission rate or the frequency of 6.6 MHz or the signal CKRI having the frequency of the transmission rate but having the low clock frequency of 5.8 MHz, it is possible to obtain the video tape recorder of high reliability.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. An apparatus for recording and reproducing a video signal and a digital audio signal, at least the digital audio signal being recorded and reproduced in either a first mode at a first clock frequency or a second mode at a second clock frequency, the apparatus comprising:

recording and playback means including a rotary drum and at least two rotary heads mounted on said rotary drum, said recording and playback means for recording said video signal and selectively recording said digital audio signal in predetermined respective video and audio portions in slant tracks on a magnetic tape wrapped around said rotary drum, said first and second clock frequencies being recorded at respective different intervals in said predetermined audio portion, and for reproducing said video signal and a selected digital audio signal;

gating means operable in response to gating signals for passing predetermined portions of the reproduced digital audio signals during respective ones of said different intervals; and detector means receiving said predetermined portions of said reproduced digital audio signals passed by said gating means during said respective different intervals for detecting the first clock frequency or the second clock frequency in said respective different intervals of the reproduced digital audio signals and judging the mode of said digital audio signal on the basis of the detected first clock frequency or the second clock frequency.

2. An apparatus according to claim 1 wherein the length of said predetermined audio portion in the slant tracks depends on the mode of said digital audio signal.

3. An apparatus according to claim 2 wherein the digital audio signal in said first mode is different from that in said second mode in the number of bits per sample.

4. An apparatus according to claim 2 wherein the digital audio signal in said first mode employs a recording modulation method which is different from that employed in said second mode.

5. An apparatus according to claim 3 or 4 wherein said digital audio signal in said second mode further comprises two different sub-modes.

6. An apparatus according to claim 5 wherein said sub-modes are different in the number of bits per word.

7. An apparatus for recording and reproducing a video signal and a digital audio signal, at least the digital audio signal being recorded and reproduced in either a first mode at a first clock frequency or a second mode at a second clock frequency, the apparatus comprising:

recording and playback means including a rotary drum and at least two rotary heads mounted on said rotary drum, said recording and playback means for recording said video signal and selectively recording said digital audio signal in predetermined portions in respective slant tracks on a magnetic tape wrapped around said rotary drum and for reproducing said video signal and a selected digital audio signal;

gating means responsive to gating signals for passing predetermined portions of the reproduced digital audio signals during respective different intervals determined by said gating signals; and detector means receiving said predetermined portions of said reproduced digital audio signals from said gating means for detecting the first clock frequency or the second clock frequency in said predetermined portions of the reproduced digital audio signals and judging the mode of said digital audio signal on the basis of the detected first clock frequency or the second clock frequency, wherein said recording and playback means further includes means for recording and reproducing a frequency-modulated audio signal combined with the video signal on said magnetic tape.

8. An apparatus for recording and reproducing a video signal and a digital audio signal, said apparatus comprising:

playback means including a rotary drum and at least two rotary heads mounted on said rotary drum, at least the digital audio signal having been recorded in either a first mode or a second mode in slant tracks on a magnetic tape wrapped around said rotary drum for an angle greater than 180°, said playback means generating a reproduced signal;

gating means operable in response to gating signals for passing predetermined portions of the reproduced digital audio signals during respective different time intervals; and detector means receiving said predetermined portions of the reproduced digital audio signal passed by said gating means during said respective different intervals for detecting a frequency of said predetermined portions of said reproduced digital audio signal and judging the mode of said digital audio signal in accordance with said detected frequency.

* * * * *